United States Patent
Mouleyre et al.

(10) Patent No.: US 10,518,753 B2
(45) Date of Patent: Dec. 31, 2019

(54) ADAPTER FOR A MOTOR VEHICLE WINDSCREEN WIPER

(71) Applicant: Valeo Systèmes d'Essuyage, Le Mesnil Saint Denis (FR)

(72) Inventors: Guillaume Mouleyre, Saint Genès Champanelle (FR); William Terrasse, Vic-le-Comte (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/349,031

(22) Filed: Nov. 11, 2016

(65) Prior Publication Data
US 2017/0136998 A1 May 18, 2017

(30) Foreign Application Priority Data

Nov. 13, 2015 (FR) ...................................... 15 60910

(51) Int. Cl.
*B60S 1/40* (2006.01)
*B60S 1/38* (2006.01)
*B60S 1/42* (2006.01)

(52) U.S. Cl.
CPC ........... *B60S 1/4009* (2013.01); *B60S 1/3853* (2013.01); *B60S 1/407* (2013.01); *B60S 1/4067* (2013.01);
(Continued)

(58) Field of Classification Search
CPC ...... B60S 1/407; B60S 1/4067; B60S 1/4048; B60S 1/4077; B60S 1/4016; B60S 1/4019;
(Continued)

(56) References Cited

U.S. PATENT DOCUMENTS

| 8,707,506 | B1 | 4/2014 | Wu |
| 2012/0060316 | A1 | 3/2012 | Avasiloaie et al. |
| 2014/0215747 | A1* | 8/2014 | Yang .................... B60S 1/4003 15/250.32 |

FOREIGN PATENT DOCUMENTS

| CN | 102958765 A | 3/2013 |
| CN | 103648858 A | 3/2014 |

(Continued)

OTHER PUBLICATIONS

Machine translation of description portion of German publication 102010030880, published Jan. 2012.*

(Continued)

*Primary Examiner* — Gary K. Graham
(74) *Attorney, Agent, or Firm* — Osha Liang LLP (57) ABSTRACT

Adapter (126) for a windscreen wiper, particularly a motor vehicle windscreen wiper, the said adapter being intended to connect a wiper blade to a first end piece of a first driving arm of the lateral locking type and secured to a cylindrical rod defining an axis (Y) of articulation of the adapter with respect to the said blade, as well as a substantially U-shaped second end piece of a second driving arm, the said adapter comprising a longitudinal body comprising first and second lateral longitudinal walls (142a, 142b) that are substantially parallel and connected together by a transverse wall (144), the said body comprising at least one through-orifice (156) configured to accommodate the said cylindrical rod, characterized in that it further comprises rotation blocking means (170b) configured to collaborate with the said first end piece in order to secure the latter and the adapter in terms of rotation about the said axis (Y).

19 Claims, 7 Drawing Sheets

(52) U.S. Cl.
CPC ........... *B60S 1/4074* (2013.01); *B60S 1/4077* (2013.01); *B60S 1/42* (2013.01); *B60S 1/4003* (2013.01); *B60S 1/4048* (2013.01)

(58) Field of Classification Search
CPC .... B60S 1/4009; B60S 1/4006; B60S 1/4003; B60S 2001/4012; B60S 1/4074; B60S 2001/4051; B60S 2001/4054
USPC ...................................................... 15/250.32
See application file for complete search history.

(56) References Cited

FOREIGN PATENT DOCUMENTS

| | | | |
|---|---|---|---|
| DE | 102008042516 A1 * | 5/2009 | |
| DE | 102010030880 A1 | 1/2012 | |
| EP | 2899078 A1 | 7/2015 | |
| FR | 2980433 * | 9/2012 | |
| WO | 2012097490 A1 | 7/2012 | |

OTHER PUBLICATIONS

Machine translation of description portion of French publication 2980433, published Sep. 2012. (Year: 2012).*
Preliminary Report Issued in Corresponding French Application No. 1560910, dated Sep. 15, 2016 (7 Pages).
First Office Action in corresponding Chinese Application No. 201611001456.5, dated Oct. 16, 2018 (12 pages).

* cited by examiner

ADAPTER FOR A MOTOR VEHICLE WINDSCREEN WIPER

TECHNICAL FIELD

The present invention relates notably to en adapter for a windscreen wiper, in particular a motor vehicle windscreen wiper.

PRIOR ART

A motor vehicle is conventionally equipped with windscreen wipers for washing the windscreen and avoiding disruption to the driver's view of his surroundings. These windscreen wipers generally comprise a driving arm that carries out an angular back-and-forth movement, and elongate blades which themselves carry blade rubbers made of a resilient material. These blade rubbers rub against the windscreen and evacuate the water by removing it from the driver's field of view. The blades are produced in the form either, in a conventional version, of articulated brackets which hold the blade rubber at a number of discrete locations, giving it a bend that allows it to follow whatever curvature the windscreen may have, or, in a more recent version, known as the "flat blade" version, of a semi-rigid assembly which holds the blade rubber along its entire length by virtue of one or more bend-forming vertebrae making it possible to press the blade against the windscreen without having to use brackets.

In both solutions, the blade is attached to the driving arm by a connection system having a connector and an adapter. The connector is a piece which is secured to the blade and which is generally fastened directly to the blade rubber or to the flat blade, whereas the adapter is secured to the arm. The adapter is an intermediate piece which allows the connector to be linked and fastened to the driving arm. It is generally configured to be inserted into a head or end piece, in the form of a yoke and having a U-shaped cross section, of the driving arm.

Each of these members (connector and adapter) comprises articulation means configured to cooperate with complementary means of the other member so as to define at least one transverse axis of articulation of the members, which is an axis of articulation of the blade with respect to the arm. In the current art, one of the members, such as the connector, generally comprises a substantially cylindrical physical pin which defines the articulation axis and is received in a housing of complementary shape in the other member.

The adapter generally has a body configured to be inserted into the end piece of the arm such that this body extends at least in part between two substantially parallel lateral walls of the end piece. The body of the adapter is connected at one end to a fairing or cowling, commonly referred to as a cap, against which the free end of the end piece comes into abutment. Lastly, the body of the adapter generally comprises an actuation button which is inserted by elastic snap-fitting into an orifice in a transverse wall of the end piece, when the latter is in abutment against the cap, in order to lock the adapter with respect to the end piece in this position.

An adapter makes it possible to join a blade to a particular type of end piece. In the case of the abovementioned end pieces with a U-shaped section, there are several varieties thereof.

There are also arms which are equipped with lateral locking end pieces. An end piece of this type is secured to a cylindrical rod that is intended to define the said articulation axis, and is intended to be rotationally inserted into an orifice of complementary shape in the body of the adapter and into an orifice in the connector. The end piece further comprises an L-shaped hook or tab which straddles the adapter.

In the current art, there are as many varieties of adapter as there are varieties of end pieces, this being neither practical nor economical. There is thus a genuine need for a universal adapter that is able to be mounted on at least two, or even more, end pieces of wiper arms, and in particular on end pieces of different types.

There are, for example, several types of arm with lateral locking end pieces. These arms may, for example, differ from one another in terms of the width of the end pieces and in particular by the width of the L-shaped tabs. End pieces comprise L-shaped tabs of relatively small width. The cylindrical rods of these tabs are generally stepped, each comprising a shoulder for bearing against the adapter.

The invention proposes a simple, effective and economical solution to this need.

SUMMARY OF THE INVENTION

The invention therefore proposes an adapter for a windscreen wiper, particularly a motor vehicle windscreen wiper, the said adapter being intended to connect a wiper blade to a first end piece of a first driving arm of the lateral locking type and secured to a cylindrical rod defining an axis of articulation of the adapter with respect to the said blade, as well as a substantially U-shaped second end piece of a second driving arm, the said adapter comprising a longitudinal body comprising first and second lateral longitudinal walls that are substantially parallel and connected together by a transverse wall, the said body comprising at least one through-orifice configured to accommodate the said cylindrical rod, characterized in that it further comprises rotation blocking means configured to collaborate with the said first end piece in order to secure the latter and the adapter in terms of rotation about the said axis.

The adapter according to the invention may be considered to be a universal adapter.

The adapter according to the invention may comprise one or more of the following features, taken individually or in combination with one another:

- the said blocking means comprise at least one retaining hook configured to collaborate with the said first end piece,
- the said at least one retaining hook is configured to collaborate by elastic snap fastening with the said first end piece,
- the said at least one retaining hook is configured to keep the said first end piece substantially bearing against a first surface of the said transverse wall,
- the said transverse wall comprises a second bearing wall configured to collaborate with the said second end piece, the said first and second bearing surfaces preferably being inclined with respect to one another,
- the said transverse wall comprises a depression configured to accept part of the said first end piece,
- the said depression comprises a wall or at least a bottom edge which is substantially parallel to the said axis and which is configured to define a first bearing surface of the said first end piece,
- the said first bearing surface is inclined with respect to an axis of elongation of the adapter,
- the said first bearing surface is situated at a longitudinal end of the body which end is connected to a cowling, a first of the said longitudinal walls comprises a first projecting bearing and guidance rib through which the said orifice passes and which is configured to collaborate with a shoulder of the said cylindrical rod, the said first rib preferably extending all around the periphery of the said orifice, a second of the said longitudinal walls comprises a second projecting bearing and guidance rib configured to collaborate with the said first end piece, each of the said first and second walls comprises several projecting bearing and guidance ribs, the ribs on the said first wall are symmetrical with the ribs of the second wall about a median longitudinal plane of the adapter substantially perpendicular to the said axis, the said body comprises elastically deformable means for elastic snap-fitting, the said means comprise at least one actuating button, the said means are situated at the level of the said first bearing surface and are configured to be moved by elastic deformation by the said first end piece when it bears against this surface, the said actuating means are configured to be situated in the vicinity of a component of the said blade and comprises at least one edge which is intended to be situated on the side of the said component and which is configured to extend at least in part around the said component when the said actuating means are elastically deformed, and the said at least one edge has a concave curved shape.

The present invention also relates to an assembly comprising an adapter as described above and a driving arm, for a windscreen wiper, in particular a motor vehicle windscreen wiper.

The present invention also relates to an assembly comprising an adapter as described above and a blade for a windscreen wiper, in particular a motor vehicle windscreen wiper.

DESCRIPTION OF THE FIGURES

The invention will be better understood and further details, features and advantages of the invention will become apparent from reading the following description given by way of non-limiting example and with reference to the appended drawings, in which.

DETAILED DESCRIPTION

It should be noted that the figures set out the invention in detail for implementing the invention, it being, of course, possible for said figures to serve to better define the invention if necessary.

In the following description, the terms "longitudinal" or "lateral" refer to the orientation of the wiper blade or of the driving arm according to the invention. The longitudinal direction corresponds to the main axis of the blade or arm along which it extends, while the lateral orientations correspond to concurrent straight lines, that is to say straight lines which cross the longitudinal direction, notably perpendicular to the longitudinal axis of the blade or arm in the plane in which it rotates. For longitudinal directions, the terms "outer" (or "rear") or "inner" (or "front") are to be assessed in relation to the point at which the blade is fastened to the arm, the term "inner" corresponding to the part where the arm and a half-blade extend, or in relation to the point at which the arm is fastened to the vehicle. Finally, the directions referenced as "upper" or "lower" correspond to orientations perpendicular to the plane of rotation of the windscreen wiper blade, the denomination "lower" containing the plane of the windscreen.

Figure 19:
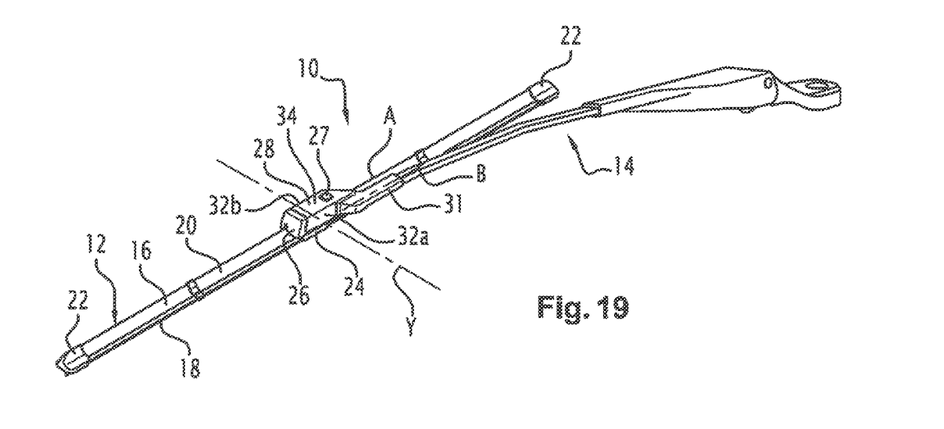
FIG. 19 is a schematic perspective view of a windscreen wiper, this windscreen wiper having a wiper blade, a driving arm for driving the blade, and a system for connecting the blade to the arm.

FIG. 19 illustrates a windscreen wiper 10 having notably a blade 12 and a driving arm 14 for driving the blade 12.

The blade 12 is preferably of the flat-blade type and comprises a longitudinal body 16, a blade rubber 18, generally made of rubber, and at least one vertebra (not visible) which stiffens the blade rubber and encourages it to press against a vehicle windscreen.

The body 16 of the blade 12 may have an upper aerodynamic deflector 20 intended to improve the operation of the wiping system, the purpose of this deflector being to improve the pressing of the blade against the windscreen and thus the aerodynamic performance of the windscreen wiper.

The blade 12 may further comprise end fittings 22 or clips for attaching the blade rubber 18 and the vertebra to the body 16, these fittings 22 being situated at each of the longitudinal ends of the body 16.

The blade 12 comprises an intermediate connector 24 substantially at its middle. An adapter 26 secured to the arm 14 is mounted on the connector 24 so as to maintain a degree of freedom to pivot about an articulation axis Y which is a transverse axis substantially perpendicular to the longitudinal axis of the blade 12. This degree of freedom allows the blade 12 to pivot with respect to the arm 14 and thus allows the blade to follow the curvature of the windscreen as it moves. The adapter 26 can be detached from the arm 14 by pressing an actuation button, in this case a push button 27, carried by the adapter.

The arm 14 is intended to be driven by a motor to follow a back-and-forth angular movement that allows water and possibly other undesirable elements with which the windscreen is covered to be evacuated. The adapter 26 provides the connection of the blade 12 to the arm 14 and, in particular, to a head or end piece 28 of the arm which may be formed in one piece with the arm or be attached and fastened thereto.

Figures 3, 4, 5, 6:
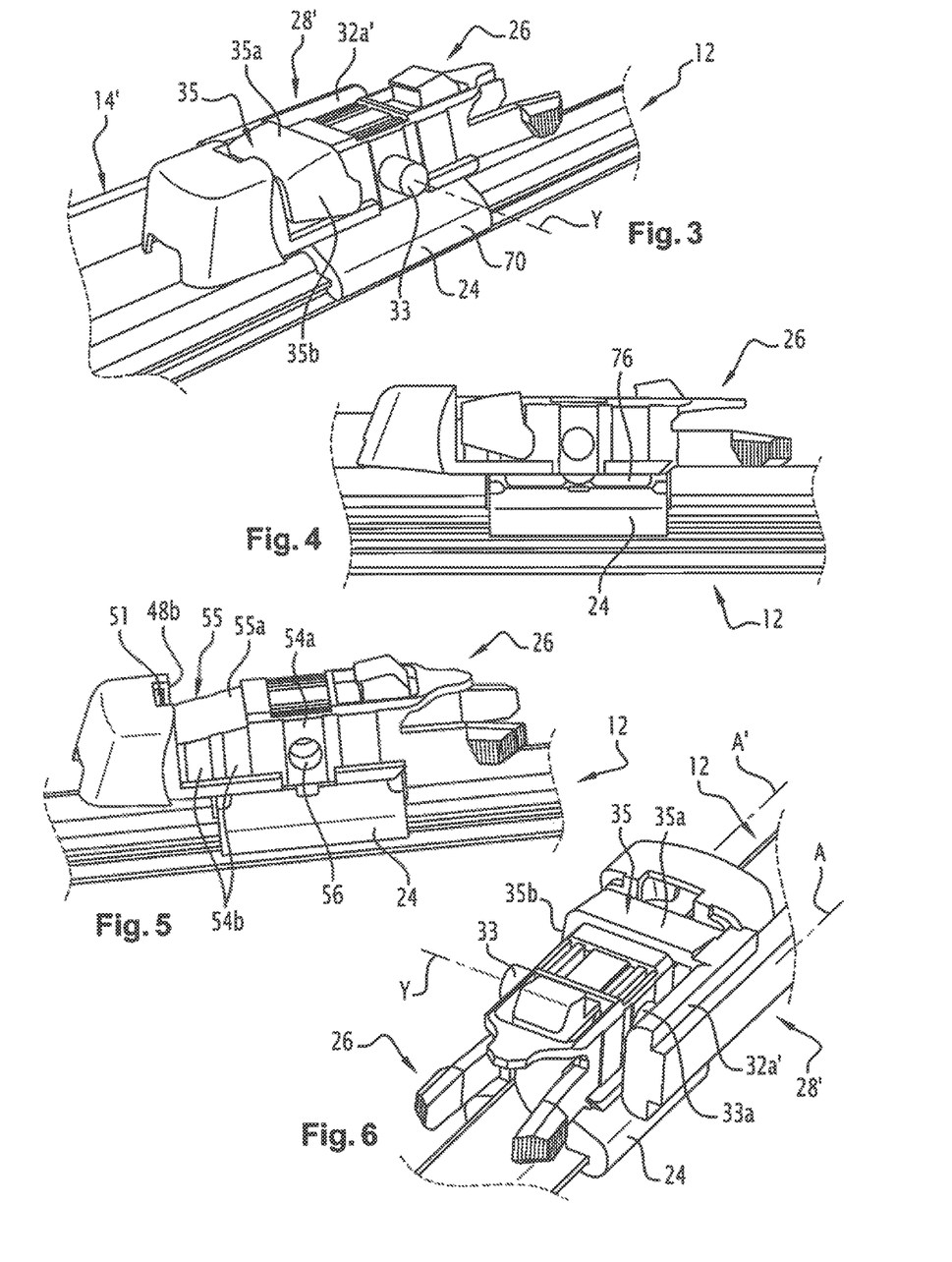
FIGS. 3 to 6 are schematic perspective views of an adapter of FIGS. 1 and 2 mounted on a windscreen wiper blade, and collaborating with an end piece of a driving arm in the case of FIGS. 3, 4 and 6, FIGS. 7 and 8 are schematic, perspective, and larger-scale views of an adapter according to a second embodiment of the invention.

In the example depicted, the adapter 26 may be connected to an end piece 28 of a first arm 14 which forms a yoke of substantially U-shaped cross section and to an end piece 28' of a second arm 14', of the vertical locking type, visible notably in FIGS. 3, 4 and 6.

In FIG. 19, the end piece 28 has an elongate shape, the axis of elongation A of which is generally substantially parallel to the axis of elongation or longitudinal axis of the blade 12. The end piece 28 comprises a connecting part for connecting to the rest of the arm 14, for example by crimping. This part has an elongate overall shape and extends along an axis B substantially parallel to the axis A and at a distance from this axis. The part is connected to a rear end or inner end of the rest of the end piece 26.

The end piece 28 comprises two lateral walls 32a, 32b, the upper longitudinal edges of which are connected together by an upper transverse wall 34. Between them, the walls 32a, 32b and the wall 34 delimit a space for accommodating the adapter 26. At their lower longitudinal edges, the walls 32a, 32b comprise means, such as hooks, for retaining the adapter 26 in the abovementioned space.

The upper wall 34 comprises a through-opening with a shape complementary to the push button 27. In the mounted position, the push button 27 is accommodated in this opening and can pass through the latter so as to protrude from the upper face of the wall 34. The push button 27 is mounted in the opening by simple insertion or fitting, preferably by elastic snap-fitting.

L is defined as being the width or lateral dimension of the end piece 28, this (external) width L being measured between the walls 32a, 32b and more precisely between the external faces thereof. The internal width L' is measured between the internal faces of the walls 32a, 32b. All widths are measured in a direction substantially perpendicular to the axis A and parallel to the wall 34. These parameters L and L', together with other parameters used in the rest of the description, will not necessarily be indicated in the drawings.

The end piece 28' of FIGS. 3, 4 and 6 has an elongate shape, the axis of elongation A of which is generally substantially parallel to the axis of elongation or longitudinal axis of the blade 12.

The end piece 28' comprises at least one lateral wall 32a' which is secured to a cylindrical rod 33 of transverse orientation. The rod 33 defines or extends along the articulation axis Y.

The rod 33 at its longitudinal end connected to the wall 32a' has an annular shoulder, in this instance a cylindrical shoulder 33a.

The end piece 28' also comprises art L-shaped lateral extension or tab 35. This tab 35 comprises a first portion 35a substantially parallel to the rod 33 and extending with this rod on one same side of the wall 32a'. The tab 35 has an elongate shape, one longitudinal end of which is connected to an upper longitudinal edge of the wall 32a' and the opposite longitudinal end of which is connected to a second portion 35b or a lip substantially perpendicular to the first portion.

The lip 35b extends substantially in a manner facing the lateral wall 32a' and is situated at a transverse distance H from this wall. This distance H is measured between the facing lateral faces of the lip 35b and the wall 32a'. The distance H is measured along the axis Y. The closest distance between the lip 35b and the rod 33, measured in the plane of the said lip 35b, is denoted B. H is, preferably slightly, greater than L.

According to a first embodiment of the invention that is depicted in FIGS. 1 to 6, the adapter 26 is of the "universal" type and is intended to be mounted on either one of the end pieces 28, 28'.

Figure 1:
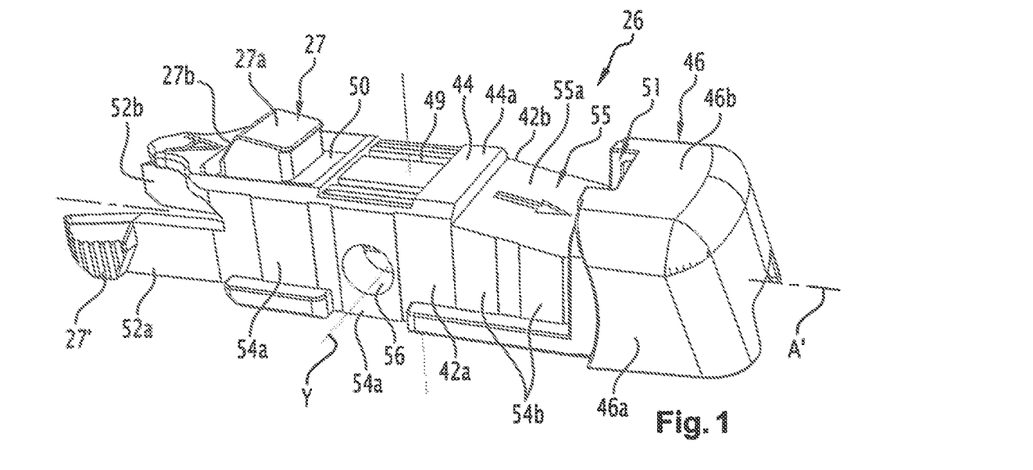
FIGS. 1 and 2 are schematic, perspective, and larger-scale views of an adapter according to a first embodiment of the invention.
Figure 2:
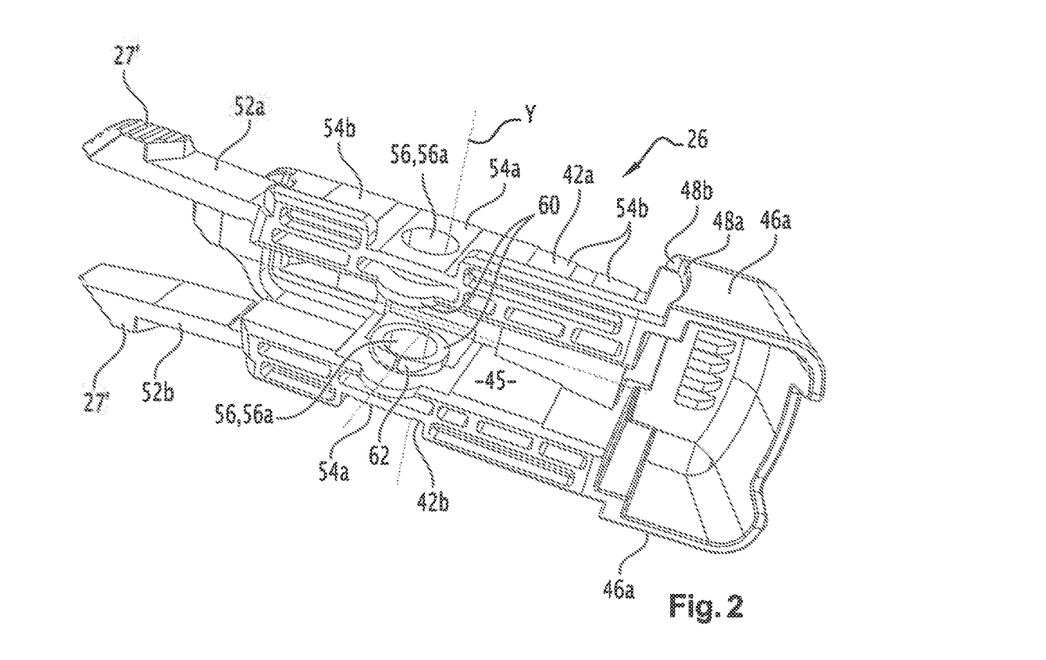

The adapter 26 has an elongate overall shape along the axis A'. It comprises a body having two lateral walls 42a, 42b, which are substantially parallel to one another and to the axis A' and are at a distance from one another. These walls 42a, 42b are connected together at their upper ends by an upper transverse wall 44 that is substantially perpendicular to the walls 42a, 42b. The walls 42a, 42b, 44 in this case have an elongate shape in the longitudinal direction.

The walls 42a, 42b, 44 of the adapter 26 between them define a longitudinal space 45 in which a part of the connector 24 is intended to be mounted.

The walls 42a, 42b are, here, of the double-skin type and each comprise two skins, an internal skin and an external skin, respectively, which are parallel to and at a transverse distance from one another. The skins are connected together by transverse rectilinear ribs.

The body of the adapter 26 is connected, at a first of its longitudinal ends, to a fairing or cowling, also called a cap or head 46. This head 46 has a lateral dimension greater than that of the body of the adapter and a height that is likewise greater than that of the body. The lateral walls 42a, 42b of the body of the adapter are thus set back or offset relative to (external) lateral faces 46a of the head, and its upper wall 44 is set back or offset relative to an (external) upper face 46b of the head.

The lateral faces 46a of the head 46 are connected to the lateral walls 42a, 42b of the body by lateral rear faces 48a, respectively, which extend substantially perpendicularly to the axis A'. The upper face 46c of the cap 46 is connected to the upper wall 44 of the body by another upper rear face 48b which also extends substantially perpendicularly to the axis A'.

The rear faces 48a, 48b of the head 46 form bearing faces of the exterior or front end of the end piece 28. More specifically, when the adapter is in the position in which it is mounted in the end piece 28, the front free edges of the lateral walls of the end piece are designed to come to bear on the faces 48a and the front free edge of the transverse wall of the end piece is designed to come to bear on the face 48b.

The upper wall 44 of the body of the adapter 26 comprises at least one surface 44a substantially parallel to the axis A', this surface is intended to collaborate in bearing and/or in sliding with the upper transverse wall 34 of the end piece 28 of FIG. 19.

The upper wall 44 of the body of the adapter 26 comprises, substantially at its middle, a window 49 or recesses. The upper wall 44 comprises, at its opposite longitudinal end to the head 46, longitudinal slots that are parallel to one another and to the axis and spaced apart from one another in such a manner as to define between them at least one portion of a longitudinal tongue 50.

The tongue 50 extends longitudinally on the opposite side to the head 46, in the continuation of the upper wall 44. It is elastically deformable and is connected at its exterior or front free end to the aforementioned upper push button 27 that projects from the tongue 50. In the free state, without constraint, each tongue 50 is such that the push button 27 is located above a plane passing via the upper wall 44. Elastic deformations of the tongues occur, here, in a substantially vertical median longitudinal plane, i.e. substantially perpendicular to the upper wall 44. The adapter 26 is thus equipped with an upper push button 27. In the example depicted, it has a front face 27a that is inclined with respect to the axis A' (in this instance downwards from rear to front) and a rear face 27b that is inclined with respect to the axis A' (in this instance upwards from rear to front). The faces 27a, 27b form between them an angle greater than 180°.

When the adapter 26 is mounted in the end piece 28, the push button 27 is intended to be engaged by elastic snap-fitting in the opening of the end piece in order to lock the adapter vis-à-vis the end piece.

The adapter 26 further comprises an upper orifice 51 for engagement of a tab of an arm end piece. Here, this orifice 51 is formed in part in the head 46, at the rear end thereof, and in part in the upper wall 44, at the front end thereof. The orifice 51 has a square or rectangular overall shape.

The lateral walls 42a, 42b of the body extend towards the interior via elastically deformable longitudinal tabs 52a, 52b. Each wall 42a, 42b is connected to a tab 52a, 52b, these tabs 52a, 52b being substantially parallel and symmetrical relative to a substantially vertical median longitudinal plane, i.e. perpendicular to the upper wall 44 of the adapter. The free ends of the tabs 52a, 52b, which are located on the opposite side to the head 46, each carry a projecting lateral push button 27'. Each tab 52a, 52b thus carries a push button 27'. Elastic deformations of the tabs 52a, 52b occur, here, in a substantially horizontal longitudinal plane, i.e. substantially parallel to the upper wall 44. The tabs 52a, 52b may be brought closer together by elastic deformation. The push buttons 27' are shaped to interact with notches of the end piece 28 or of another end piece, not depicted.

The lateral walls 42a, 42b each comprise a through-orifice 56. The orifices 56 in the walls 42a, 42b are substantially coaxial and, here, define the axis Y of pivoting of the adapter 26 on the connector 24 and thus of the blade vis-à-vis the arm. The orifices 56 are, here, circular in section and each comprise a substantially cylindrical internal surface 56a. The orifices 56 open at their external lateral ends onto external faces of the walls 42a, 42b, respectively, and at their internal lateral ends into the longitudinal space 45.

The opposing internal lateral faces of the lateral walls 42a, 42b comprise protuberances 60. Each lateral wall 42a, 42b comprises a protuberance 60, the protuberances here being opposite one another and extending substantially towards one another. The protuberances 60 are symmetrical relative to a median longitudinal plane of the adapter, perpendicular to the upper wall 44. Each protuberance 60 also has a plane of symmetry passing via the axis Y and perpendicular to the axis A'.

Each protuberance 60 is holed and comprises a through-hole. This hole is, here, formed by one of the aforesaid orifices 56. Each protuberance 60 is thus located on the internal face of the lateral wall 42a or 42b so that the orifice 56 in this wall passes through it.

Each protuberance 60 has a cylindrical and, here, tubular general shape on account of the orifice 56 passing through it. The axis of each orifice 56, which is coincident with the axis Y, is likewise coincident with the axis of the corresponding cylindrical protuberance 60, such that the orifice is centred vis-à-vis the protuberance. Each protuberance 60 thus forms an annular bead of material around the orifice 56, having, substantially, a radial thickness relative to the axis Y that is substantially constant. Each protuberance 60 has an axial dimension along the axis Y that represents approximately 10 to 20% of the axial dimension or width of the space 45 along the axis Y. Each protuberance 60 has an external diameter that represents approximately 60 to 80% of the height of the corresponding lateral wall 42a, 42b, measured in a direction substantially vertical and perpendicular to the upper wall 44.

Each protuberance 60 comprises a part, in this instance a lower part, that is truncated or chamfered. Each truncated or chamfered part defines a ramp 62 extending in a plane that is inclined relative to the lateral walls 42a, 42b. Each ramp 62 defines at least one sliding surface, and, here, two sliding surfaces, intended to interact with the connector 24. The ramps 62 of the protuberances 60 are inclined such that they diverge from one another from the top towards the bottom.

In the example shown, each ramp 62 has, in cross section, a form that is substantially an inverted V. As mentioned in the foregoing, it comprises two sliding surfaces that are adjacent and inclined with respect to one another. The two surfaces 62a, 62b are, here, inclined relative to one another by an angle of between 190 and 330°, and preferably between 200 and 240°.

The ramp 62 is formed by a chamfer situated on an external annular edge face of the protuberance 60.

The ramps 62 and the surfaces thereof are symmetrical relative to a first median longitudinal plane perpendicular to the upper wall 44 and also relative to a second plane perpendicular to the first plane and to the wall 44 and passing via the axis Y.

Each protuberance 60 further comprises two diametrically opposed external flaps.

The adapter 26 is fastened to the connector 24 by virtue of the protuberances 60 that form means for fastening the adapter to the connector and which can furthermore form means for pivoting of the adapter vis-à-vis the connector. The fastening means are of the elastic snap-fit type, the protuberances 60 of the adapter 26 being designed to interact by elastic snap-fitting with complementary means of the connector 24.

The connector 24 is arranged so as to be rendered secure, for example by crimping, on the blade 12. The connector 24 provides a 'complete' mechanical connection with the blade 12, in the sense that there is no degree of freedom. The connector 24 may also provide a function of transporting and distributing a liquid for washing the vehicle windscreen.

Figure 18:
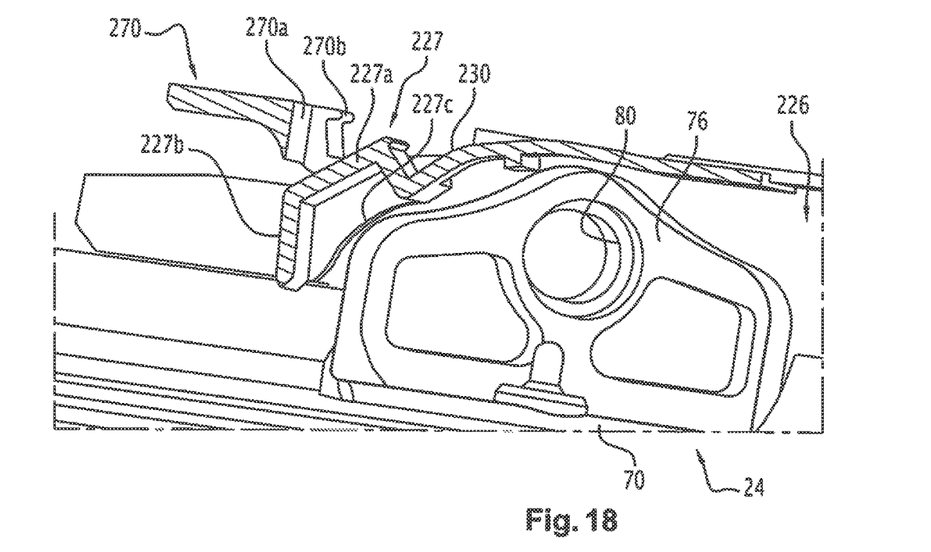

With reference to FIGS. 3, 4 and 18, the connector 24 may comprise a base 70 which extends longitudinally and transversely. This base 70 comprises a zone of securing to the blade 12 and, more particularly, to at least one vertebra of this blade. This securing zone has the form, for example, of a slit made in the base 70, this slit being bordered by two hooks capable of engaging on the blade.

The base 70 is surmounted by a flank 76, for example, made as one with the base. This flank 76 has a transverse dimension that is less than that of the base and a longitudinal dimension substantially equal to that of the base. The flank 76 is, for example, centred on the base 70, along the axis Y. The flank 76 may have a plurality of ribs that mechanically reinforce the flank. The flank has a width or dimension along the axis Y that is less than L.

The connector 24 and the adapter 26 are connected mechanically by a pivot connection. As far as the connector 24 is concerned, this pivot connection is implemented by an orifice 80 made in the flank 76. This orifice 80 extends along the axis Y. It passes through the flank 76. In other words, the orifice 80 has a central axis centred on the axis Y.

The connector 24 described above is advantageously a unit, i.e. made of one and the same synthetic material. This connector may thus be manufactured in the course of a single moulding operation, particularly by means of injection moulding.

The adapter 26 is mounted on the connector 24 by elastic snap-fitting of its protuberances 60 into the orifice 80 of the connector. The ramps 62 of the protuberances 60 of the adapter 26 interact with the connector in order to facilitate this mounting. The connector, meanwhile, may also comprise means facilitating an insertion of the protuberances 60 of the adapter 26 into its cavity 10.

The lateral walls 42a, 42b of the body of the adapter 26 further comprise, on their external lateral faces, projecting ribs 54a, 54b defining bearing faces in the transverse direction. At least some 54a of these projecting ribs are located at the level of the orifices 56 and, in the example shown, have these orifices passing through them. The ribs 54a here have a width or longitudinal dimension along the axis A' which is greater than the diameter of the orifice 56 passing through it. The orifice 56 is substantially situated in the middle of this rib, in the longitudinal direction, such that the orifice 56 does not extend beyond the rib 54a. In other words, the rib 54a extends around the entire periphery of the corresponding orifice 56.

The ribs 54a through which the orifices 56 pass have a width greater than that of the other ribs 54b.

The ribs 54a, 54b are formed here of strips of material of small thickness in the transverse direction on the external lateral faces of the lateral walls 42a, 42b. The ribs have an elongate form and extend longitudinally between the lower and upper longitudinal edges of the walls 42a, 42b.

The ribs 54a, 54b define bearing faces that are substantially parallel. These bearing faces are, here, substantially parallel to the external lateral faces of the walls 42a, 42b and also to the longitudinal axis of the adapter 26. The dimension L is measured between these bearing faces.

The ribs 54a, 54b are spaced apart from one another in the longitudinal direction and distributed over the lateral walls 42a, 42b in the same direction. In the example shown, each lateral wall comprises four ribs 54a, 54b. The ribs of one of the lateral walls are symmetrical relative to the ribs of the other of the lateral walls, relative to a median longitudinal plane of the adapter substantially perpendicular to its upper wall 44.

The median transverse plane perpendicular to the upper wall 44 of the adapter 26 and passing via the axis Y passes through the ribs 54a substantially at their middle and is a plane of symmetry of these ribs. In other words, the ribs 54a are substantially centred on the axis Y and the orifices 58.

The ribs 54a, 54b may collaborate in sliding with the internal faces of the lateral walls 32a, 32b of the end piece 28. When the adapter 26 has been inserted into the end piece 28, by axial translational movement, from the front to the rear, along the axis A, the walls 32a, 32b of the end piece 28 extend on either side of the body of the adapter and are flush with the lateral walls 42a, 42b thereof, or are even in contact with the latter. The hooks of the end piece become inserted under the body of the adapter in order to hold it in the end piece 28. Lastly, the end piece 28 bears by way of its front edges against the faces 48a, 48b of the cap 46, and the push button 27 is fitted in the opening 38 in the end piece. In the mounted position, the axes A and A' are substantially coincident.

The rib 54a of one of the walls 32a', 32b' of the adapter 26' is intended to collaborate in sliding with the shoulder of the rod 33a and at least one of the ribs 54b of the other wall of the adapter is intended to collaborate in sliding with the lip 35b of the tab 35 of the adapter. In the example depicted, the shoulder 33a collaborates with the rib 54a of the wall 42a and the lip 35b collaborates with the foremost rib 54b of the wall 42b.

The arm 14' is mounted on the adapter 26 in the following manner. The end piece 28' is disposed on the side of the adapter 26 and the cylindrical rod 33 is aligned with the orifices 56 in the adapter 26. The end piece is moved towards the adapter by translational movement along the axis Y, the end piece being oriented about the axis Y with respect to the adapter such that its lip 35b passes over the upper wall 44 of the body. This is allowed by the abovementioned distance B. This translational movement is continued until the shoulder 33a comes to bear laterally against the rib 54a of the wall 42a, The arm 14' is then moved in rotation about the axis Y with respect to the adapter 26, until the lip 35b cooperates with the front rib 54b of the wall 42b by sliding, as is shown in FIGS. 3, 4 and 6. In the mounted position, the axes A and A' are parallel to and at a distance from one another.

The body of the adapter on its upper wall 44 comprises a depression 55 which extends transversely substantially between the lateral walls 42a, 42b, This depression 55 extends close to a transverse plane P that is perpendicular to the longitudinal axis A' of the adapter and passing substantially through the orifices 56.

The depression 55 is configured to accommodate part of the end piece 28' and, in particular, the first portion 35a of the tab 35 thereof, as has been depicted in the drawings.

In the example depicted, the rod 33 of the end piece 28 is situated forward of the tab 35 thereof. The depression 55 of the adapter is here situated at the front of the adapter, just to the rear of its head 46.

It will be appreciated that, therefore, as has been depicted in the drawings, the adapter will need to be in the opposite position (its front end oriented towards the rear of the arm and its rear end oriented towards the front of the arm) so that once the rod 33 of the arm has been engaged in the orifices 56 of the adapter, the tab 35 of the arm and, in particular, the first portion 35a thereof, can engage in the depression 55 of the adapter.

The depression 55 comprises a bottom wall, substantially parallel to the axis A', which defines at least one bearing surface 55a for the portion 35a.

The depression 55 allows the end piece 28' and the arm to adopt a position in which they are substantially parallel to the adapter 26. This is particularly advantageous for optimizing the steeving of the blade on a vehicle window and for ensuring that the entirety of the blade is pressed against this window, and uniformly so.

The surface 55a of the depression is in this instance inclined with respect to the wall 44 and therefore the axis A'. In the example depicted, it extends downwards from the rear of the adapter towards the front. The angle of inclination is, for example, comprised between 10 and 40°.

The surface 55a is connected to the face 48b and to the upper orifice 51. It is connected to the upper ends of two adjacent front ribs 54a on each of the lateral walls 42a, 42b.

Advantageously, the adapter 26 could comprise rotation blocking means intended for example to collaborate by elastic snap-fastening with the end piece 28 in order to secure them against relative rotation. The blocking means could be configured to keep the portion 35a of the end piece in the depression and could be situated on a longitudinal end of the surface 55a, on the face 48b, on the face 46b, etc.

The adapter 26 described above is advantageously a unit, i.e. made of one and the same synthetic material. It may thus be manufactured in the course of a single moulding operation, particularly by means of injection-moulding.

FIGS. 7 to 12 show a variant embodiment of the invention in which the adapter 126 is of the "universal" type and is intended to be mounted either on a laterally locking end piece 28' or on an end piece 28 with a U-shaped section.

The foregoing description in relation to the adapter 26 and how it is mounted on and interacts with the blade and the arm, apply to the adapter 126 insofar as this does not contradict what follows.

Figure 7:
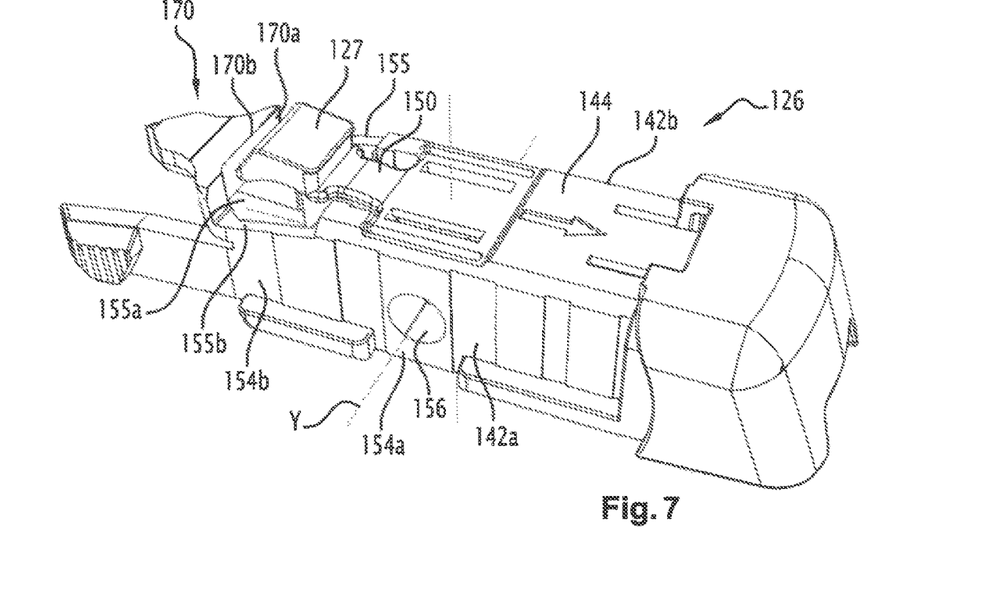
Figure 8:
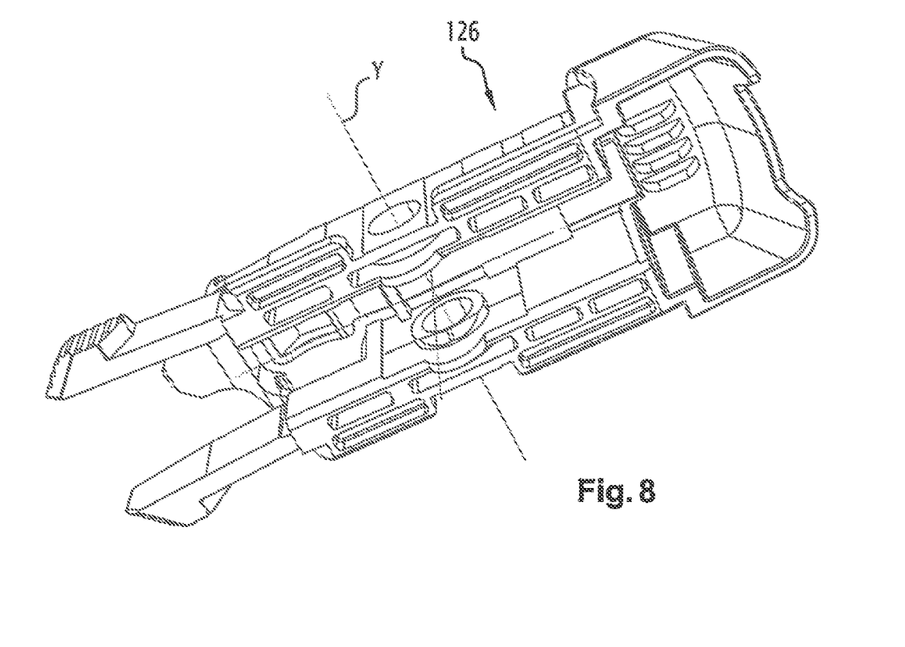

Unlike the adapter 26, the adapter 126 is intended to be mounted with respect to the end piece 28' in such a way that its front end is oriented towards the front of the end piece. Thus the adapter 126 comprises a depression 155 which is provided not in the vicinity of the front end of the adapter but in the vicinity of the rear end thereof.

The depression 155 is situated on the upper wall of the body of the adapter and extends transversely substantially between the lateral walls 142a, 142b of this body. This depression 155 extends close to, and to the rear of, a transverse plane P that is perpendicular to the longitudinal axis A' of the adapter and passes substantially through the orifices 156.

Figures 9, 10:
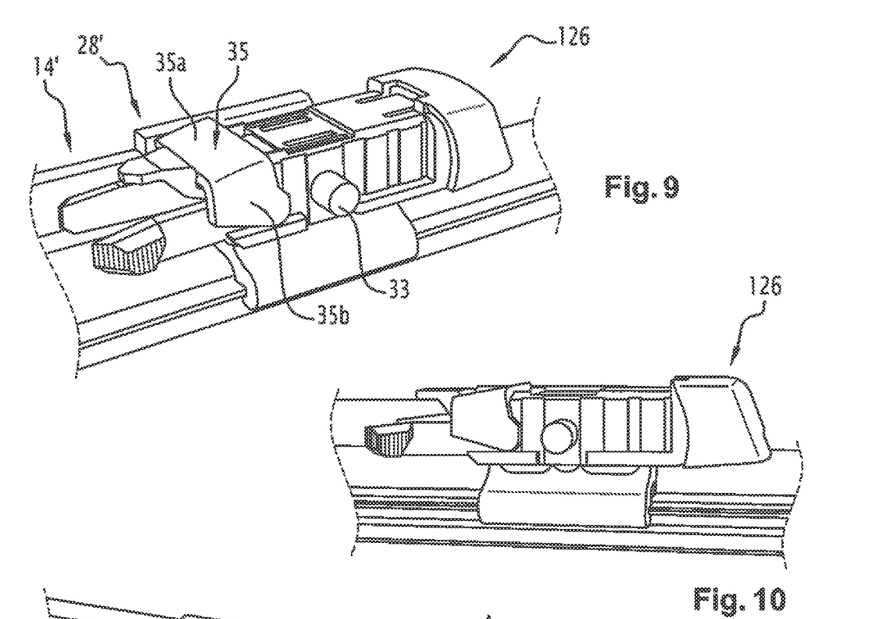
FIGS. 9 to 12 are schematic perspective views of the adapter of FIGS. 7 and 8 mounted on a windscreen wiper blade and collaborating with an end piece of a driving arm in the case of FIGS. 9 to 11, FIGS. 13 and 14 are schematic, perspective, and larger-scale views of an adapter according to a third embodiment of the invention.
Figure 11:
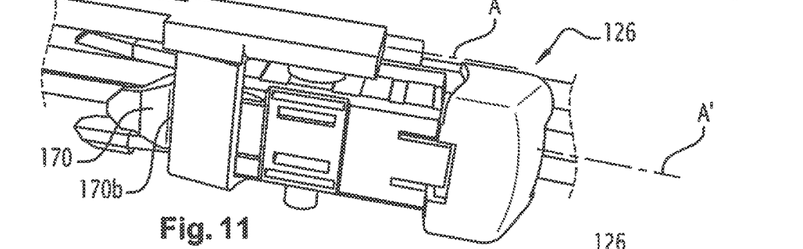

The depression 155 is configured to accept part of the end piece 28' and, in particular, the first portion 35a of the tab 35 thereof, as described in the foregoing.

In the example depicted, the depression 155 is situated at the level of the button 127 and more exactly underneath the latter. The depression 155 comprises a through-aperture 155a through which the button can be moved by elastic deformation of the tongue.

The depression 155 is notably delimited by two rear upper longitudinal edges of the walls 142a, 142b, which extend one on each side of the aperture 155a. These edges define bearing surfaces 155b. These surfaces 155b are coplanar, their plane being substantially parallel to the axis Y. This plane is inclined with respect to the upper wall 144 of the adapter, upwards from front to rear. The angle of inclination is, for example, comprised between 10 and 40°.

The surfaces 155b are connected to the upper end of the rearmost rib 154b of each wall 142a, 142b of the adapter.

The depression 155 is defined at the front by a rear edge of the upper wall 144 and at the rear by a front face 170a of a catching element 170.

This element 170 is configured to collaborate in elastic snap fastening with the tab 35 of the end piece. The element 170 comprises a hook 170b at the level of the upper edge of its front face 170a.

This hook extends substantially over the entire transverse dimension of the element and is intended to collaborate with the rear edge of the second portion 35b of the tab, as depicted in FIGS. 9 to 11. Attachment of the end piece 28' to the adapter allows it to be secured in terms of rotation about the axis Y with respect to the adapter, and therefore makes it possible to ensure that the pivoting of the adapter with respect to the connector results in the pivoting of the arm with respect to the connector and therefore of the blade secured to the connector. The hook 170b thus forms rotation blocking means.

Figure 12:
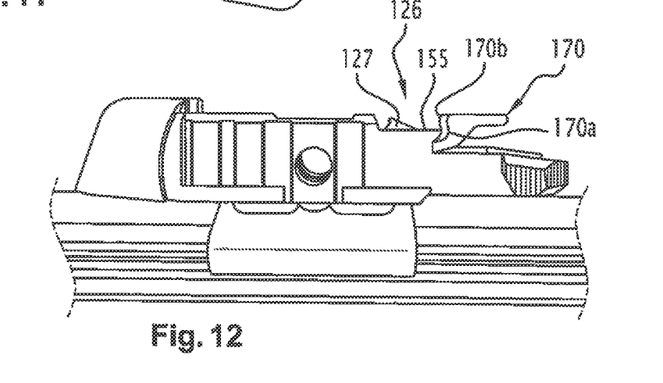

The arm 14' is mounted on the adapter 126 in the following manner. The end piece 28' is disposed on the side of the adapter 126 and the cylindrical rod 33 is aligned with the orifices 156 in the adapter 126. The end piece is moved towards the adapter by translational movement along the axis Y, the end piece being oriented about the axis Y with respect to the adapter such that its lip 35b passes over the upper wall 144 of the body. This translational movement is continued with the shoulder of the rod comes to bear laterally against the rib 154a of the wall 142b. The arm 14' is then moved in rotation about the axis Y with respect to the adapter 126, until the lip 35b cooperates with the rear rib 154b of the wall 142a by sliding, as is shown in FIGS. 9 to 11. During this movement, the tab 36 bears via its portion 35a against the button 127 and forces it down and through the aperture 155a. The tongue 150 which connects the button 127 to the upper wall 144 is therefore elastically deformed and the button 127 adopts the position as depicted in FIG. 12. This movement is continued until the tab 35 engages in the depression 155 and is held in this position by collaboration with the hook 170b of the member 170. In this mounted position, the axes A and A' are parallel to and at a distance from one another.

FIGS. 13 to 18 show another variant embodiment of the invention in which the adapter 226 is of the "universe" type and is intended to be mounted either on a laterally locking end piece 28' or on an end piece 28 with a U-shaped section.

The foregoing description in relation to the adapter 26 and how it is mounted on and interacts with the blade and the arm apply to the adapter 226 insofar as this does not contradict what follows.

Figure 13:
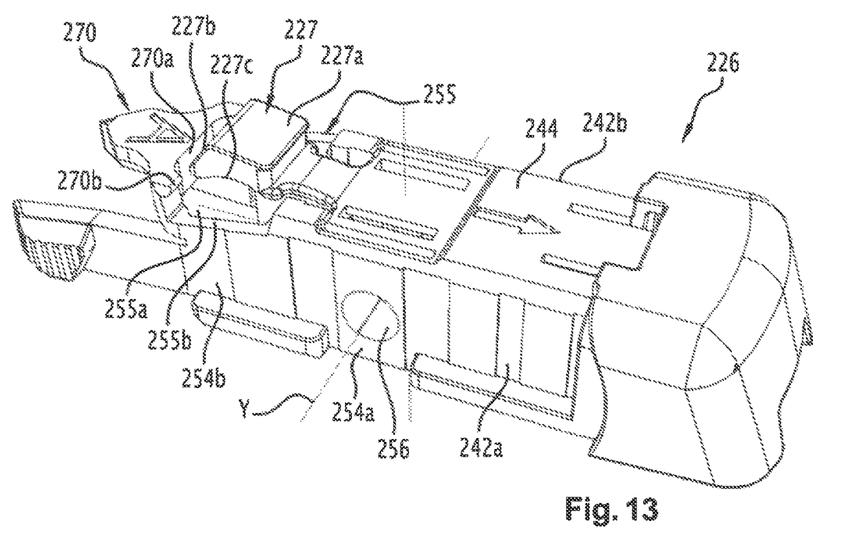
Figure 14:
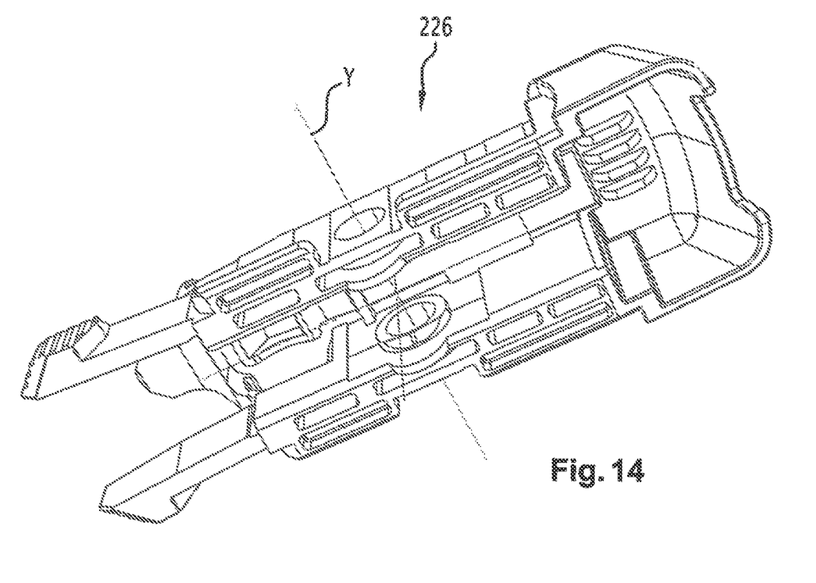

Unlike the adapter 26, the adapter 226 is intended to be mounted with respect to the end piece 28' in such a way that its front end is oriented toward the front of the end piece. Thus, the adapter 226 comprises a depression 255 which is provided, not in the vicinity of the front end of the adapter but in the vicinity of the rear end thereof.

The depression 255 is situated on the upper wall 244 of the body of the adapter and extends transversely substantially between the lateral walls 242a, 242b of this body. This depression 255 extends close to, and to the rear of, a transverse plane P that is perpendicular to the longitudinal axis A' of the adapter and passing substantially through the orifices 255.

Figure 15:
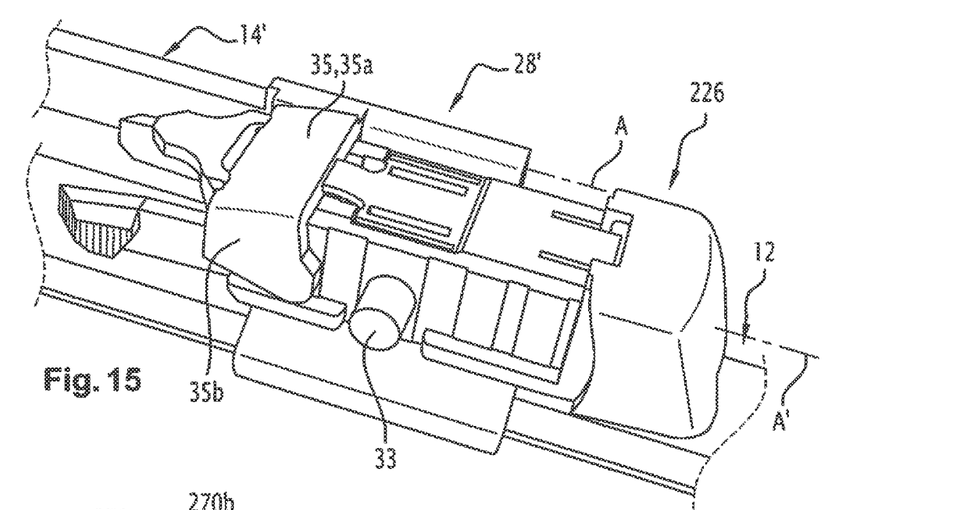
FIGS. 15 to 18 are schematic perspective views of the adapter of FIGS. 13 and 14 mounted on a windscreen wiper blade and collaborating with an end piece of a driving arm in the case of FIGS. 16 and 15, the adapter also being viewed in longitudinal section in FIG. 16.
Figure 16:
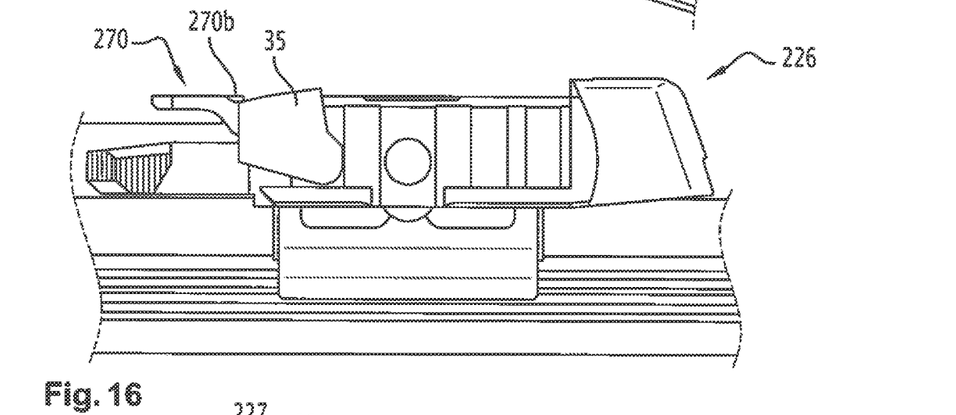

The depression 255 is configured to accept part of the end piece 28' and, in particular, the first portion 35a of the tab 35 thereof, as described in the foregoing.

In the example depicted, the depression 255 is situated at the level of the button 227 and, more specifically, underneath the latter. The depression 255 comprises a through-aperture 255a through which the button can be moved by elastic deformation of the tongue.

The depression 255 is notably delimited by two rear upper longitudinal edges of the walls 242a, 242b, which extend one on each side of the aperture 255a. These edges define bearing surfaces 255b. These surfaces 255b are coplanar, their plane being substantially parallel to the axis Y. This plane is inclined with respect to the upper wall 244 of the adapter, upwards from front to rear. The angle of inclination is, for example, comprised between 10 and 40°.

The surfaces 255b are connected to the upper end of the rearmost rib 254b of each wall 242a, 242b of the adapter.

The depression 255 is defined at the front by a rear edge of the upper wall 244 and at the rear by a front face 270a of a catching element 270.

This element 270 is configured to collaborate in elastic snap fastening with the tab 35 of the end piece. The element 170 comprises two lateral hooks 270b at the level of the upper edge of its front face 270a. The hooks 270b are at a distance from one another.

These hooks 270b are intended to collaborate with the rear edge of the second portion 35b of the tab, as depicted in FIGS. 15 and 16. The fastening of the end piece 28' to the adapter allows it to be secured in terms of rotation about the axis Y with respect to the adapter, and therefore makes it possible to ensure that the pivoting of the adapter with respect to the connector results in the pivoting of the arm with respect to the connector and therefore of the blade secured to the connector. The hooks 270*b* thus form rotation blocking means.

The arm 14' is mounted on the adapter 226 in the following manner. The end piece 28' is disposed on the side of the adapter 226 and the cylindrical rod 33 is aligned with the orifices 256 in the adapter 226. The end piece is moved towards the adapter by translational movement along the axis Y, the end piece being oriented about the axis Y with respect to the adapter such that its lip 35*b* passes over the upper wall 244 of the body. This translational movement is continued until the shoulder of the rod comes to bear laterally against the rib 154*a* of the wall 242*b*. The arm 14' is then moved in rotation about the axis Y with respect to the adapter 226, until the lip 35*b* cooperates with the rear rib 254*b* of the wall 242*a* by sliding. During this movement, the tab 35 bears via its portion 35*a* against the button 227 and forces it down and through the aperture 255*a*. The tongue 250 which connects the button 227 to the upper wall 244 is then elastically deformed and the button 227 adopts the position as depicted in FIG. 12. This movement is continued until the tab 35 engages in the depression 255 and is held in this position by collaboration with the hook 270*b* of the member 270. In this mounted position, the axes A and A' are parallel to and at a distance from one another.

FIG. 18 shows the position of the button 227 with respect to the connector 24 when the button is forced downwards by the end piece 28' and the tongue 250 is flexed. In this position, the button 227 is close to the connector 24, and particularly to the flank 76 thereof.

Advantageously, and as depicted in this figure and in FIG. 13, the button is configured so that it does not come into contact with the connector in this position. In the example depicted, the button 227 comprises at least one edge 227*c* which is intended to be situated on the side of the connector 24 and which is configured to extend at least partially around the latter in the aforementioned position. This edge 227*c* has a concave curved shape.

Figure 17:
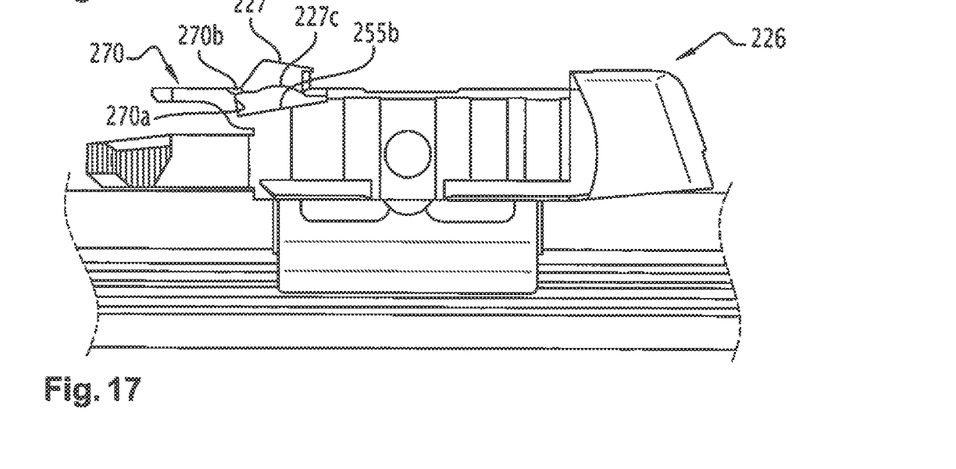

In FIGS. 13 and 17 it may be seen that the button 227 comprises two lateral walls which are substantially parallel to the walls 242*a*, 242*b*. These walls are connected to one another by an upper transverse wall in the form of a dihedron and having the aforementioned inclined front 227*a* and rear 227*b* faces. The lower ends of these lateral walls form the edges 227*c*. In the deformed position depicted in FIG. 18, the edges 227*c* have a curved shape substantially about the axis Y.

The invention claimed is:

1. An adapter for a motor vehicle windscreen wiper, the adapter being configured to connect a wiper blade to a first end piece of a first driving arm via lateral locking and secured to a cylindrical rod defining an axis of articulation of the adapter with respect to the blade, as well as a substantially U-shaped second end piece of a second driving arm, the adapter comprising:
   a longitudinal body comprising first and second lateral longitudinal walls that are substantially parallel and connected together by a transverse wall, the longitudinal body comprising at least one through-orifice configured to accommodate the said cylindrical rod;
   rotation blocking means configured to collaborate with the first end piece in order to secure the latter and the adapter in terms of rotation about the said axis; and
   an adapter head integral to the adapter and having a lateral dimension and height greater than those of the adapter body, the adapter head comprising a rear face that forms a bearing face of a front end of one of the first end piece and the second end piece,
   wherein the blocking means comprise at least one retaining hook configured to collaborate with the said first end piece.

2. The adapter according to claim 1, in which the said at least one retaining hook is configured to collaborate by elastic snap fastening with the said first end piece.

3. The adapter according to claim 1, in which the at least one retaining hook is configured to keep the said first end piece substantially bearing against a first surface of the transverse wall.

4. The adapter according to claim 3, in which the transverse wall comprises a second bearing wall configured to collaborate with the second end piece, the first and second bearing surfaces being inclined with respect to one another.

5. The adapter according to claim 1, in which the transverse wall comprises a depression configured to accept part of the first end piece.

6. The adapter according to claim 5, in which the depression comprises a wall or at least a bottom edge which is substantially parallel to the axis and which is configured to define a first bearing surface of the said first end piece.

7. The adapter according to claim 6, in which the first bearing surface is inclined with respect to an axis of elongation of the adapter.

8. The adapter according to claim 6, in which the first bearing surface is situated at a longitudinal end of the body which end is connected to a cowling.

9. The adapter according to claim 1, in which a first of the longitudinal walls comprises a first projecting bearing and guidance rib through which the orifice passes and which is configured to collaborate with a shoulder of the said cylindrical rod, the first rib extending all around the periphery of the orifice.

10. The adapter according to claim 9, in which a second of the said longitudinal walls comprises a second projecting bearing and guidance rib configured to collaborate with the first end piece.

11. The adapter according to claim 9, in which each of the first and second walls comprises several projecting bearing and guidance ribs.

12. The adapter according to claim 11, in which the ribs on the first wall are symmetrical with the ribs of the second wall about a median longitudinal plane of the adapter substantially perpendicular to the axis.

13. The adapter according to claim 1, in which the body comprises elastically deformable means for elastic snap-fitting.

14. An assembly comprising an adapter according to claim 1 and a driving arm, for a motor vehicle windscreen wiper.

15. An assembly comprising an adapter according to claim 1 and a blade for a motor vehicle windscreen wiper.

16. An adapter for a motor vehicle windscreen wiper, the adapter being configured to connect a wiper blade to a first end piece of a first driving arm via lateral locking and secured to a cylindrical rod defining an axis of articulation of the adapter with respect to the blade, as well as a substantially U-shaped second end piece of a second driving arm, the adapter comprising:
   a longitudinal body comprising first and second lateral longitudinal walls that are substantially parallel and connected together by a transverse wall, the longitudinal body comprising at least one through-orifice configured to accommodate the said cylindrical rod; and rotation blocking means configured to collaborate with the first end piece in order to secure the latter and the adapter in terms of rotation about the said axis, the longitudinal body further comprising elastically deformable means with a lateral push button for elastic snap-fitting, the lateral push button being configured to interact with a notch of the second end piece, wherein the blocking means comprise at least one retaining hook configured to collaborate with the said first end piece, wherein the retaining hook comprises a vertical wall and a lateral protrusion extending from an uppermost portion of the vertical wall, and wherein the retaining hook is configured to extend over a portion of the first end piece, and configured to restrict the first end piece movement in a first direction perpendicular to the axis of articulation, and in a second direction perpendicular to the first direction.

17. The adapter according to claim 16, in which the elastically deformable means are situated at a level of a first bearing surface and are configured to be moved by elastic deformation by the first end piece when the first end piece bears against the first bearing surface.

18. The adapter according to claim 16, in which the elastically deformable means are configured to be situated in a vicinity of a component of the blade and comprises at least one edge which is intended to be situated on a side of the said component and which is configured to extend at least in part around the said component when the said elastically deformable means are elastically deformed.

19. The adapter according to claim 18, in which the at least one edge has a concave curved shape.

* * * * *